US012782285B2

(12) United States Patent
Braun

(10) Patent No.: US 12,782,285 B2
(45) Date of Patent: Nov. 3, 2026

(54) VARIABLE MICROFLUIDIC OPTICAL FILTERS, HYPERSPECTRAL IMAGING SYSTEMS, AND METHODS OF HYPERSPECTRAL IMAGING INCORPORATING VARIABLE MICROFLUIDIC OPTICAL FILTERS

(71) Applicant: William Braun, Rochester, NY (US)

(72) Inventor: William Braun, Rochester, NY (US)

(73) Assignee: Rochester Institute of Technology, Rochester, NY (US)

( * ) Notice: Subject to any disclaimer, the term of this patent is extended or adjusted under 35 U.S.C. 154(b) by 77 days.

(21) Appl. No.: 19/054,582

(22) Filed: Feb. 14, 2025

(65) Prior Publication Data

US 2025/0258098 A1 Aug. 14, 2025

Related U.S. Application Data

(60) Provisional application No. 63/553,219, filed on Feb. 14, 2024.

(51) Int. Cl.

| | |
|---|---|
| ***G01N 21/64*** | (2006.01) |
| ***G01N 21/31*** | (2006.01) |
| *B82Y 35/00* | (2011.01) |

(52) U.S. Cl.

CPC ..... *G01N 21/6456* (2013.01); *G01N 21/3103* (2013.01); *B82Y 35/00* (2013.01)

(58) Field of Classification Search

CPC ........... G01N 21/6456; G01N 21/3103; G01N 21/6489; G01N 2201/1296; B82Y 35/00; B82Y 20/00; B01L 2300/0883; B01L 3/502715

USPC .... 356/73, 72, 337–338, 335–344, 328, 326

See application file for complete search history.

(56) References Cited

U.S. PATENT DOCUMENTS

| | | | | |
|---|---|---|---|---|
| 7,466,409 | B2 | 12/2008 | Scherer et al. | |
| 8,233,148 | B2 | 7/2012 | Bodkin et al. | |
| 10,307,871 | B2 | 6/2019 | Coleman | |
| 11,016,017 | B2 * | 5/2021 | Lo | G01J 3/0208 |
| 2004/0021078 | A1 * | 2/2004 | Hagler | G01J 3/06 250/339.13 |
| 2004/0119020 | A1 * | 6/2004 | Bodkin | G01J 3/02 250/353 |

(Continued)

OTHER PUBLICATIONS

"Cubert Video Spectroscopy," Cubert, https://www.cubert-hyperspectral.com/products/ultris-x20 (accessed Dec. 11, 2023).

(Continued)

*Primary Examiner* — Isiaka O Akanbi

(74) *Attorney, Agent, or Firm* — Bond Schoeneck & King, PLLC; Joseph M. Noto

(57) ABSTRACT

Provided herein are systems and methods of hyperspectral imaging microfluidic flow filters comprising flowable, optically-active bodies. These systems and methods provide novel light filtering systems and methods that improve spatial, spectral, and temporal resolution of hyperspectral imaging systems. In various aspects, the embodiments include measuring signals from a sensor array based on light reflected or emitted by the target, where a microfluidic channel system is arranged to allow light to pass through optically-active bodies flowing through the microfluidic channel system before reaching the sensor array.

20 Claims, 9 Drawing Sheets

100

(56) References Cited

U.S. PATENT DOCUMENTS

| | | | | |
|---|---|---|---|---|
| 2006/0177348 A1* | 8/2006 | Yasuda | B01L 3/502715 | 422/73 |
| 2006/0194307 A1* | 8/2006 | Yasuda | B01L 3/502761 | 209/552 |
| 2007/0070347 A1* | 3/2007 | Scherer | G01N 21/05 | 356/454 |
| 2009/0014360 A1* | 1/2009 | Toner | C12M 23/16 | 209/208 |
| 2010/0056928 A1* | 3/2010 | Zuzak | G01J 3/2823 | 356/302 |
| 2010/0185067 A1* | 7/2010 | Gupta | G01J 3/1256 | 600/323 |
| 2018/0031480 A1* | 2/2018 | Sinclair | B01L 3/502761 | |
| 2019/0302000 A1* | 10/2019 | Lo | G01J 3/0208 | |
| 2020/0193580 A1* | 6/2020 | McCall | G01J 3/2803 | |
| 2024/0048823 A1* | 2/2024 | Yu | G01J 3/28 | |

OTHER PUBLICATIONS

Chan, E.M., et al., "High-temperature microfluidic synthesis of CdSe nanocrystals in Nanoliter droplets," Journal of the American Chemical Society, vol. 127, No. 40, pp. 13854-13861,2005. doi:10.1021/ja051381p.

Deng, C., et al., "Snapshot hyperspectral imaging via spectral basis multiplexing in Fourier domain," Optics Express vol. 26, No. 25, Nov. 28, 2018, pp. 1-13.

Khan, M.J., et al. "Modern Trends in Hyperspectral Image Analysis: A Review," Mar. 12, 2018, IEEE, vol. 6, pp. 14118-14129.

Kim, E.B., et al., "Nucleation control of quantum dot synthesis in a microfluidic continuous flow reactor," Frontiers in Nanotechnology, vol. 4, 2023. doi:10.3389/fnano.2022.1096267.

Mandal, S.K., et al., "Encapsulation of Magnetic and Fluorescent Nanoparticles in Emulsion Droplets," Langmuir 2005, 21, 9, pp. 4175-4179, Mar. 24, 2005.

Mekki-Berrada, F., et al., "High-throughput and High-speed Absorbance Measurements in Microfluidic Droplets using Hyperspectral Imaging," Special Collection of Chemistry-Methods and the European Journal of Organic Chemistry, Jan. 2022, pp. 1-10.

Shojaei-Zadeh, S., et al., "Highly crosslinked poly(dimethylsiloxane) microbeads with uniformly dispersed quantum dot nanocrystals," Journal of Colloid and Interface Science 363, Jul. 14, 2011, pp. 25-33.

Tohgha, U.N. "Electrowetting Behavior and Digital Microfluidic Applications of Fluorescent, Polymer-Encapsulated Quantum Dot Nanofluids," ACS Appl. Mater. Interfaces 2019, 11, 31, 28487-28498, Jul. 10, 2019.

Zhu, L., et al., "Integrated microfluidic variable optical attenuator," Optics Express, Nov. 28, 2005, vol. 13, No. 24, pp. 1-6.

* cited by examiner

VARIABLE MICROFLUIDIC OPTICAL FILTERS, HYPERSPECTRAL IMAGING SYSTEMS, AND METHODS OF HYPERSPECTRAL IMAGING INCORPORATING VARIABLE MICROFLUIDIC OPTICAL FILTERS

CROSS-REFERENCE TO RELATED APPLICATIONS

This application claims priority to U.S. Provisional Patent Application Ser. No. 63/553,219, filed on Feb. 14, 2024 and entitled "QUANTUM DOT FLOW FILTER", the entirety of which is incorporated herein by reference.

FIELD OF THE DISCLOSURE

The present disclosure relates generally to flowable bodies containing optically-active components such as semiconductor nanocrystallites, i.e., "quantum dots" (QDs), and more specifically to hyperspectral imaging systems and methods of hyperspectral imaging that incorporate microfluidic optical filters comprising flowable optically-active bodies.

BACKGROUND

Colloidal quantum dots are semiconducting nanocrystals that generally have diameters below 20 nm, and as a result, exhibit quantum behavior due to the confinement of electrons within their structure. Physicists had recognized that size-dependent quantum effects could arise in nanoscale crystals since the mid twentieth century, but it was not until the 1980s and 1990s that the synthesis of these structures became suitable for practical applications. The discovery and development of quantum dots has enabled revolutionary advancements across various technologies including biomedical sensing, high-definition displays, photovoltaics, and imaging. In 2023, Moungi G. Bawendi, Louis E. Brus, and Aleksey Yekimov were awarded the Nobel Prize in Chemistry for their work related to quantum dots.

Still, many applications of quantum dots remain unexplored. In particular, the potential applications of quantum dots in the area of hyperspectral imaging has not yet been fully investigated or appreciated. Hyperspectral imaging systems aim to capture spatial, temporal, and spectral information from an imaging target (i.e., an object and/or scene). While conventional cameras use three visible light bands (red, green, and blue) to create images, hyperspectral imagers measure an imaging target across many bands (typically at least 10 bands) over a wide range of wavelengths (e.g., 250 nm to 15,000 nm). Because every material and compound reacts with light differently, the spectral signatures of imaged targets will also be different and therefore provide useful information. Hyperspectral imaging systems have applications in a number of areas, including environmental monitoring, machine vision, agriculture, medical imaging, minerology, defense, astrophysics, and many more. Nonetheless, hyperspectral imaging systems suffer from a number of drawbacks, including limited spatial resolution, limited spectral resolution, impractical physical designs, and/or complex computation requirements.

SUMMARY OF THE DISCLOSURE

According to one embodiment of the present disclosure, a hyperspectral imaging system is provided. The hyperspectral imaging system can include: a flow filter comprising a plurality of optically-active bodies and a microfluidic channel system, the microfluidic channel system defining a flow path for the plurality of optically-active bodies; and a sensor array comprising a plurality of light-sensitive elements, wherein each light-sensitive sensor is configured to measure light intensity based on light that is reflected and/or emitted by an imaging target located outside of the flow filter and modified by an optically-active body within the flow filter. In an aspect, the microfluidic channel system of the flow filter is arranged relative to the sensor array such that the light that is reflected and/or emitted by the imaging target passes through the microfluidic channel system before reaching one or more of the plurality of light-sensitive elements.

In an aspect, the plurality of optically-active bodies comprises at least three filter bodies having distinct absorbance and/or photoluminescence curves over a desired range of wavelengths.

In an aspect, the plurality of optically-active bodies comprises a repeating sequence of at least three filter bodies.

In an aspect, the plurality of optically-active bodies comprises at least fifty filter bodies having distinct absorbance curves over the desired spectrum.

In an aspect, the flow filter further can further include: a liquid continuous phase; and a continuous phase pump fluidly connected to the microfluidic channel system. In an aspect, the continuous phase pump is configured to pump the liquid continuous phase through the microfluidic channel system, and wherein the plurality of optically-active bodies are carried through the microfluidic channel system by the liquid continuous phase.

In an aspect, the plurality of optically-active bodies are ordered sequentially and carried sequentially through the microfluidic channel system.

In an aspect, each optically-active body of the plurality of optically-active bodies comprises a body medium and an optically-active component contained within the body medium.

In an aspect, the optically-active component comprises a plurality of quantum dots.

In an aspect, the plurality of optically-active bodies comprises at least three filter bodies having distinct absorbance and/or photoluminescence curves over a desired range of wavelengths, and the optically-active component of each of the at least three filter bodies comprises quantum dots having a different size and/or shape and/or composition.

In an aspect, the body medium comprises a liquid that is immiscible with the liquid continuous phase.

In an aspect, the body medium comprises at least one of a solid, a semi-solid, a gel, and a liquid polymer material.

In an aspect, the flow filter further comprises one or more optically opaque spacers disposed between each of the plurality of optically-active bodies.

In an aspect, the hyperspectral imaging system can further include a hyperspectral imaging controller. The hyperspectral imaging controller can include: one or more processors; and a non-transitory computer-readable memory storing instructions that, when executed by the one or more processors, causes the hyperspectral imaging controller to perform one or more of the following operations: (i) generating sensor data using the sensor array based on the light that is reflected and/or emitted by the imaging target, wherein the sensor data comprises, for each light-sensitive element of the sensor array, a plurality of light intensity measurements; and (ii) recovering a spectral signature for the imaging target based on the sensor data generated, wherein the spectral signature is recovered using a compressive sensing algorithm and/or a trained machine learning algorithm.

According to another embodiment of the present disclosure, a flow filter for moderating light is provided. The flow filter can include: a plurality of optically-active bodies, wherein each optically-active body comprises a body medium and an optically-active component contained within the body medium; a microfluidic channel system defining a flow path for the plurality of optically-active bodies; a liquid continuous phase configured to carry the plurality of optically-active bodies through the microfluidic channel system along the flow path; and a continuous phase pump fluidly connected to the microfluidic channel system, wherein the continuous phase pump is configured to pump the liquid continuous phase through the microfluidic channel system such that the liquid continuous phase carries the plurality of optically-active bodies through the microfluidic channel system along the flow path.

In an aspect, the plurality of optically-active bodies comprises at least three filter bodies having distinct absorbance and/or photoluminescence curves over a desired range of wavelengths, the optically-active component of the plurality of optically-active bodies comprises a plurality of quantum dots, and each of the at least three filter bodies comprise quantum dots having a different size and/or shape and/or composition.

In an aspect, the body medium of the plurality of optically-active bodies comprises a liquid that is immiscible with the liquid continuous phase, and/or the body medium of the plurality of optically-active bodies comprises a solid, a semi-solid, a gel, and a liquid polymer material.

In an aspect, the plurality of optically-active bodies are ordered sequentially and carried sequentially through the microfluidic channel system.

According to still another embodiment of the present disclosure, a method of hyperspectral imaging is provided. The method may utilize a hyperspectral imaging system comprising a lens, a flow filter, a sensor array having a plurality of light-sensitive elements, and a hyperspectral imaging controller. The method can include: directing the lens of the hyperspectral imaging system towards an imaging target; flowing a plurality of optically-active bodies through a microfluidic channel system of the flow filter; receiving, through the lens of the hyperspectral imaging system, light that is reflected and/or emitted by the imaging target; measuring signals from one or more of the plurality of light-sensitive elements of the sensor array based on the light that is reflected and/or emitted by an imaging target located outside of the flow filter and modified by an optically-active body within the flow filter; and recovering, via one or more processors of the hyperspectral imaging controller, a spectral data for the imaging target based on the measured signals. In an aspect, the microfluidic channel system is arranged relative to the sensor array such that the received light that is reflected and/or emitted by the imaging target is passed through one or more of the plurality of optically-active bodies flowing within the microfluidic channel system before reaching one or more of the plurality of light-sensitive elements of the sensor array.

In an aspect, the plurality of optically-active bodies comprises at least three filter bodies having distinct absorbance and/or photoluminescence curves over a desired range of wavelengths, and the measured signals include light intensity measurements corresponding to the received light that has passed through each of the at least three filter bodies.

In an aspect, each optically-active body of the plurality of optically-active bodies comprises a body medium and an optically-active component contained within the body medium, the optically-active component comprises a plurality of quantum dots, and the plurality of optically-active bodies are ordered sequentially and flowed sequentially through the microfluidic channel system.

These and other aspects of the various embodiments will be apparent from and elucidated with reference to the embodiments described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF THE EMBODIMENTS

Figure 1:
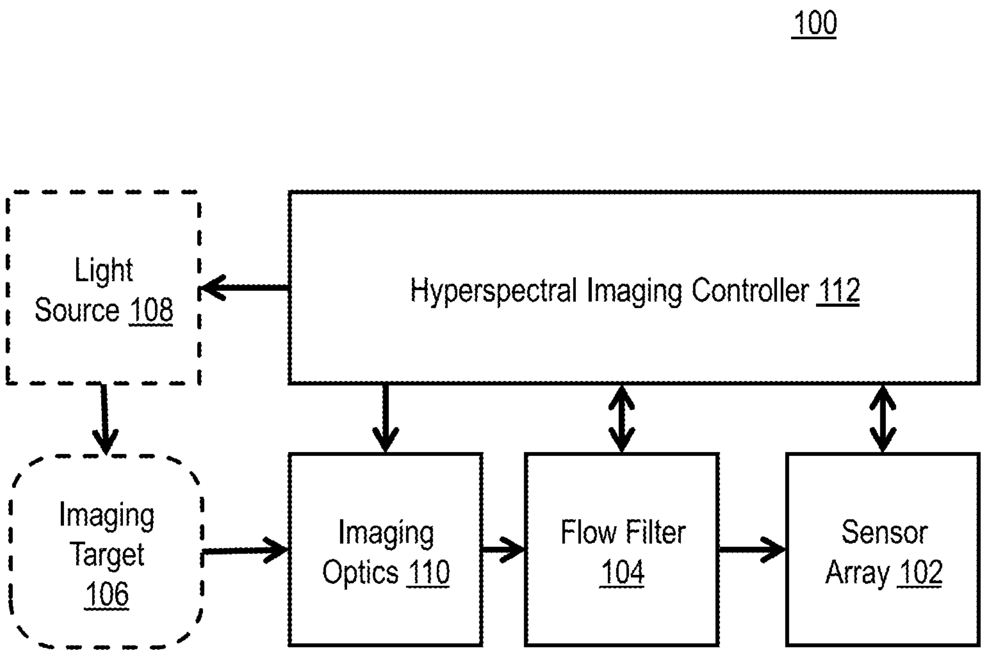
FIG. 1 is a block diagram of a hyperspectral imaging system illustrated in accordance with aspects of the present disclosure.

The present disclosure relates generally to flowable bodies containing optically-active components such as semiconductor nanocrystallites, i.e., “quantum dots” (QDs), and more specifically to hyperspectral imaging systems and methods of hyperspectral imaging that incorporate microfluidic optical filters comprising flowable optically-active bodies. As described herein, hyperspectral imaging systems measure optical spectra for many points across a target scene, often repeatedly, within a desired range of the electromagnetic spectrum. Hyperspectral imaging can provide detailed spectral information that allows for precise identification of materials and their properties, can be non-invasive and non-destructive, can detect subtle changes and variations in material, and can be used in a wide range of fields such as environmental monitoring, machine vision, agriculture, medical imaging, minerology, defense, astrophysics, and many more. As such, hyperspectral imaging can provide significant advantages over other types of sensing.

Two main hyperspectral imaging systems currently exist: spatial and spectral scanning imagers. Both, however, suffer from their own drawbacks. For example, a spatial scanner cannot quickly access all spectral information from an image at once and is limited by the scan speed. Further, scanners used in these imagers are often mechanical in nature and subject to breaking or misalignment.

On the other hand, a spectral scanning system may select a limited number of wavelengths of interest and project intensity data onto a detector, but spatial and/or temporal resolution may be sacrificed. Other forms of hyperspectral imaging have been developed, such as snapshot hyperspectral imaging where spectral data is instantaneously captured with spatial information.

However, these techniques are often costly and suffer from a sacrifice in spatial resolution or require complex computation. For example, current cutting-edge snapshot hyperspectral imaging technology generally uses either advanced mathematical techniques (e.g. compressive sensing) to extract a large data set from a limited sample or complex diffractive/filtering optics to sample a number of wavelengths.

Systems using mathematical techniques to resolve a signal require extensive computation and have yet to be demonstrated in a practical system fit for commercial or consumer use. Complex diffractive or filtering optics systems are expensive and often require mechanical movement and come at the expense of spatial resolution (e.g. the Cubert ULTRIS X20 can achieve 410×410 spatial pixels with 164 spectral bands). For comparison, a 1080p image is 1920×1080 pixels. Thus, there exists no cost effective or compact hyperspectral imaging system capable of high spatial (pixel-level) and high spectral (>50 bands) resolution while maintaining snapshot capability. In this respect, snapshot capability refers to the system's ability to capture hyperspectral images in a single exposure, without the need for scanning, i.e., the entire scene is captured within seconds or less.

Accordingly, the present disclosure describes systems and methods that integrate hyperspectral imaging techniques with the use of microfluidic flows of optically-active bodies (e.g., quantum dots) to provide both high spatial, spectral, and temporal resolution. The systems and methods described herein may also address one or more other drawbacks of conventional hyperspectral imaging systems, which will be apparent based on this disclosure.

Turning now to FIG. 1, a block diagram of an exemplary hyperspectral imaging system 100 is illustrated in accordance with certain aspects of the present disclosure. In embodiments, the hyperspectral imaging system 100 preferably includes a sensor array 102 and a flow filter 104. As described herein, the hyperspectral imaging system 100 is configured to capture light from an imaging target 106, which is then modulated (e.g., filtered) by one or more optically-active bodies that flow through the flow filter 104 before being measured at the sensor array 102.

More specifically, when an imaging target 106 is illuminated by a light source 108, the imaging subject will interact with the light from the light source 108 by absorbing, reflecting, and/or emitting electromagnetic radiation (e.g., light). Then, when the hyperspectral imaging system 100 is directed towards the illuminated imaging target 106, the hyperspectral imaging system 100 can capture light that is reflected and/or emitted by the illuminated imaging target 106. This captured light can be passed through the flow filter 104 to the sensor array 102, which includes a plurality of light-sensitive elements configured to measure the intensity of the captured light after it has been modified by one or more optically-active bodies within the flow filter.

In embodiments, the hyperspectral imaging system 100 may include the light source 108 that at least partially provides the light exposure to the imaging target 106. For example, the light source 108 can be, without limitation, a halogen lamp, an LED, a laser, an infrared lamp, an ultraviolet lamp, and/or the like, including combinations thereof. In some embodiments, the light source 108 can include multiple lamps of the same or different kind. In other embodiments, the hyperspectral imaging system 100 may not include its own light source 108. For example, in some embodiments, the light source 108 may be the sun which illuminates the imaging target 106.

In embodiments, the imaging target 106 can be an imaging target and/or scene. For example, in particular embodiments, the imaging target 106 may be crops in a field, minerals in an oil field, a biological tissue sample, and/or the like. However, it should be appreciated that anything capable of reflecting, absorbing, and/or emitting light may be imaged by the hyperspectral imaging system 100. Furthermore, it should be appreciated that the imaging targets 106 contemplated herein are not the optically-active bodies that flow through the flow filter 104. Rather, the imaging targets 106 are external to, i.e., outside of, the flow filter 104 as illustrated in FIG. 1.

In embodiments, the sensor array 102 can include a plurality of light-sensitive elements, sometimes referred to a pixels. These light-sensitive elements or pixels can be arranged in a particular configuration, such as a linear or a two-dimensional array, depending on the specific technique utilized. Typically, the light-sensitive elements of the sensor array 102 are based either on a charged coupled device (CCD) or complementary metal-oxide-semiconductor (CMOS) technology. However, other types of light-sensitive technologies suitable for hyperspectral imaging may be utilized with the flow filters of the present disclosure.

In particular embodiments, the light-sensitive elements of the sensor array 102 may be configured to measure the intensity of light within a desired spectrum. For example, the light-sensitive elements may be configured to measure light intensity over one or more of the following spectral ranges:

| Spectral Range | Wavelength (nm) |
|---|---|
| Visible (VIS) | 400 to 700 |
| Visible + Near Infrared (VNIR) | 400 to 1,000 |
| Near Infrared (NIR) | 900 to 1,700 |
| Short Wave Infrared (SWIR) | 1,000 to 2,500 |
| Mid Wave Infrared (MWIR) | 3,000 to 5,000 |
| Long Wave Infrared (LWIR) | 8,000 to 14,000 |

In conventional imaging systems, the spectral resolution of the imaging system depends on the ability of the system to distinguish between different wavelengths, with higher spectral resolution indicating narrower spectral bands. According to the present disclosure, the hyperspectral imaging system 100 can have a spectral resolution that is dependent on the number of different optically-active bodies utilized in the flow filter 104. In particular embodiments, the hyperspectral imaging system 100 can have a spectral resolution of less than a nanometer to tens of nanometers depending on the number of optically-active bodies used, their optical characteristics, and spectral recovery processes.

The spatial resolution of the hyperspectral imaging system 100 refers to the size of the smallest object that can be resolved in the captured image, which is typically determined by the size of the pixel. In particular embodiments, each light-sensitive element can have a pixel size of fractions of a micron to tens of microns, including a pixel size of about 5 μm.

The temporal resolution of a hyperspectral imaging system refers to the speed at which the sensor array 102 can capture all of the information necessary for spectral recovery and is typically measured in frames per second. Notably, this differs from the amount of times the sensor or individual pixels trigger per second since many intensity measurements must be taken per hyperspectral frame. In particular embodiments, the temporal resolution of the hyperspectral imaging system can vary from one to tens or hundreds of frames per second depending on the number of measurements needed per frame and the maximum trigger rate of the sensor/pixels.

Once the light that is emitted and/or reflected by the imaging target 106 is captured by the hyperspectral imaging system 100 and modified by an optically-active body in the flow filter 104, this captured light (i.e., incident light) causes the light-sensitive elements of the sensor array 102 to generate signals based on the incident light's intensity. The hyperspectral imaging system 100 can then record and process these signals (i.e., sensor data) into a usable spectral data. In particular embodiments, the spectral data can be a hyperspectral data cube, where two dimensions represent the spatial information (x and y coordinates) and the third dimension represents the spectral information (wavelengths). However, it is contemplated that the sensor data generated by the sensor array 102 may be processed into other usable forms, as may be known in the art.

As also shown in FIG. 1, the flow filter 104 can be arranged relative to the sensor array 102 such that the light that is reflected and/or emitted by the target 106 passes through at least a portion of the flow filter 104 before reaching the plurality of light-sensitive elements of the sensor array 102. In particular, the flow filter 104 may be arranged relative to the sensor array 102 such that the light that is reflected and/or emitted by the target 106 passes through the one or more optically-active bodies flowed through a microfluidic channel system of the flow filter 104.

In particular embodiments, the hyperspectral imaging system 100 can include an optical lens assembly 110 used to focus light from the imaging target 106 into the hyperspectral imaging system 100. In further embodiments, the hyperspectral imaging system 100 may also include one or more other components and/or subsystems (not shown) as may be known in the art, including but not limited to, a scanning aperture and/or imaging optics such as various lenses, mirrors, and/or the like.

In embodiments, the hyperspectral imaging system 100 may include a hyperspectral imaging controller 112 operatively connected to the optical lens assembly 110, the flow filter 104, the sensor array 102, and the other components (not shown) of the hyperspectral imaging system 100. The hyperspectral imaging controller 112 can be configured to: (1) generate sensor data using the sensor array based on the light that is reflected and/or emitted by the imaging target 106, wherein the sensor data comprises, for each light-sensitive element of the sensor array 102, a plurality of light intensity measurements; and (2) recovering a spectral signature for the imaging target 106 based on the sensor data generated.

Figure 2:
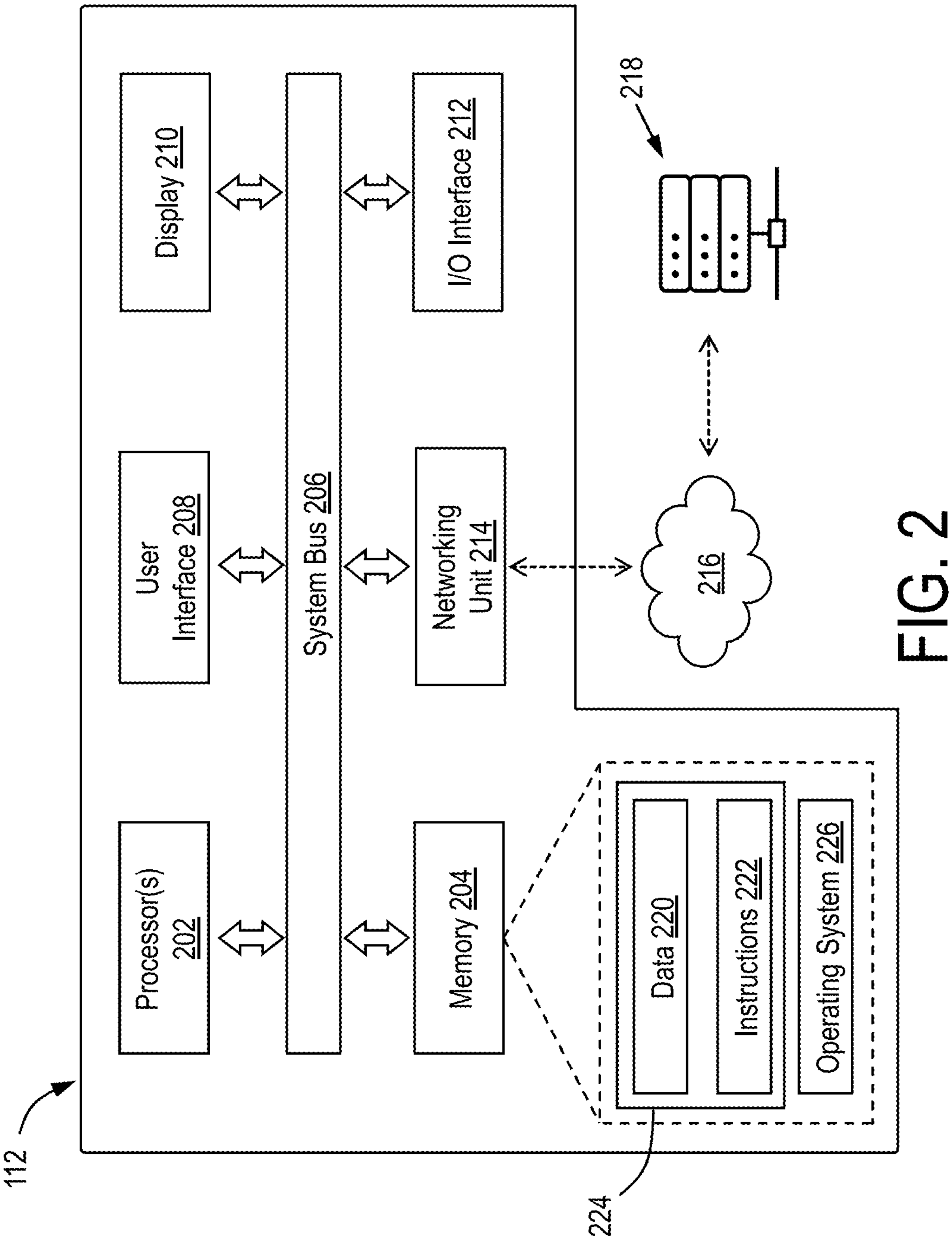
FIG. 2 is a diagram of an imaging controller illustrated in accordance with aspects of the present disclosure.

More specifically, with reference to FIG. 2, a functional block diagram of an exemplary hyperspectral imaging controller 112 of a hyperspectral imaging system 100 is illustrated according to certain aspects of the present disclosure. As shown, the hyperspectral imaging controller 112 can include one or more processors 202 and a computer-readable memory 204 interconnected and/or in communication via a system bus 206 containing conductive circuit pathways through which instructions (e.g., machine-readable signals) may travel to effectuate communication, tasks, storage, and the like. The hyperspectral imaging controller 112 can be connected to a power source (not shown), which can include an internal power supply and/or an external power supply. In embodiments, the hyperspectral imaging controller 112 can also include one or more additional components, such as a user interface 208, a display 210, an input/output (I/O) interface 212, a networking unit 214, and the like, including combinations thereof. As shown, each of these components may be interconnected and/or in communication via the system bus 206, for example.

In embodiments, the one or more processors 202 can include one or more high-speed data processors adequate to execute the program components described herein and/or perform one or more operations of the methods described herein. The one or more processors 202 may include a microprocessor, a multi-core processor, a multithreaded processor, an ultra-low voltage processor, an embedded processor, and/or the like, including combinations thereof. The one or more processors 202 can include multiple processor cores on a single die and/or may be a part of a system on a chip (SoC) in which the processor 202 and other components are formed into a single integrated circuit, or a single package. That is, the one or more processors 202 may be a single processor, multiple independent processors, or multiple processor cores on a single die.

In embodiments, the user interface 208 may be configured to receive various forms of input from a user associated with the imaging controller 112. The user interface 208 can include, but is not limited to, one or more of a keyboard, keypad, trackpad, trackball(s), capacitive keyboard, controller (e.g., a gaming controller), computer mouse, computer stylus/pen, a voice input device, and/or the like, including combinations thereof.

In embodiments, the display device 210 may be configured to display information, including text, graphs, and/or the like. The display device 210 can include, but is not limited to, a liquid crystal display (LCD), a light-emitting diode (LED) display, a touch screen or other touch-enabled display, a foldable display, a projection display, and so on, or combinations thereof.

In embodiments, the input/output (I/O) interface 212 may be configured to connect and/or enable communication with one or more peripheral devices (not shown), including but not limited to additional machine-readable memory devices, diagnostic equipment, and other attachable devices. The I/O interface 212 may include one or more I/O ports that provide a physical connection to the one or more peripheral devices. In some embodiments, the I/O interface 212 may include one or more serial ports.

In embodiments, the networking unit 214 may include one or more types of networking interfaces that facilitate wired and/or wireless communication between the hyperspectral imaging system 100 and one or more external devices. That is, the networking unit 214 may operatively connect the hyperspectral imaging system 100 to one or more types of communications networks 216, which can include a direction interconnection, the Internet, a local area network ("LAN"), a metropolitan area network ("MAN"), a wide area network ("WAN"), a wired or Ethernet connection, a wireless connection, a cellular network, and similar types of communications networks, including combinations thereof. In some embodiments, the hyperspectral imaging system 100 may communicate with one or more remote/cloud-based servers and/or cloud-based services, such as a remote server 218 for data storage, via the communications network 216.

In embodiments, the memory 204 can be variously embodied in one or more forms of machine accessible and machine-readable memory. In some embodiments, the memory 204 includes a storage device (not shown), which can include, but is not limited to, a non-transitory storage medium, a magnetic disk storage, an optical disk storage, an array of storage devices, a solid-state memory device, and/or the like, as well as combinations thereof. The memory 204 may also include one or more other types of memory, such as dynamic random-access memory (DRAM), static random-access memory (SRAM), erasable programmable read-only memory (EPROM), electrically erasable programmable read-only memory (EEPROM), Flash memory, and/or the like, as well as combinations thereof. In embodiments, the memory 204 may include one or more types of transitory and/or non-transitory memory.

The imaging controller 112 can be configured by software components stored in the memory 204 to: (1) process the signals measured by the sensor array 102 to form, for example, a hyperspectral data cube; (2) store and retrieve large volumes of data generated by the hyperspectral imaging system 100; and/or (3) manage the operation of the entire hyperspectral imaging system 100. In particular embodiments, the memory 204 can be configured to store data/information 220 and computer-readable instructions 222 that, when executed by the one or more processors 202, causes the imaging controller 112 to at least: (1) measuring and recording signals from the plurality of light-sensitive elements of the sensor array 102; and (2) recovering spectral data based on the measured signals.

The imaging controller 112 may also include an operating system component 226, which may be stored in the memory 204. The operating system component 226 may be an executable program facilitating the operation of the hyperspectral imaging system 100. Typically, the operating system component 226 can facilitate access of the I/O interface 212, network interface 214, the user interface 208, and the display 210, and can communicate or control other components of the hyperspectral imaging system 100.

As described herein, the hyperspectral imaging system 100 includes a flow filter 104, which can be a variable microfluidic optical filter that is configured to modulate the incident light captured by the hyperspectral imaging system 100 before it reaches the sensor array 102. More specifically, in accordance with aspects of the present disclosure, the flow filter 104 is configured to flow a plurality of optically-active bodies through microfluidic channels as the incident light is captured, such that the optically-active bodies modulate the incident light before being measured by the sensor array 102.

Figure 3:
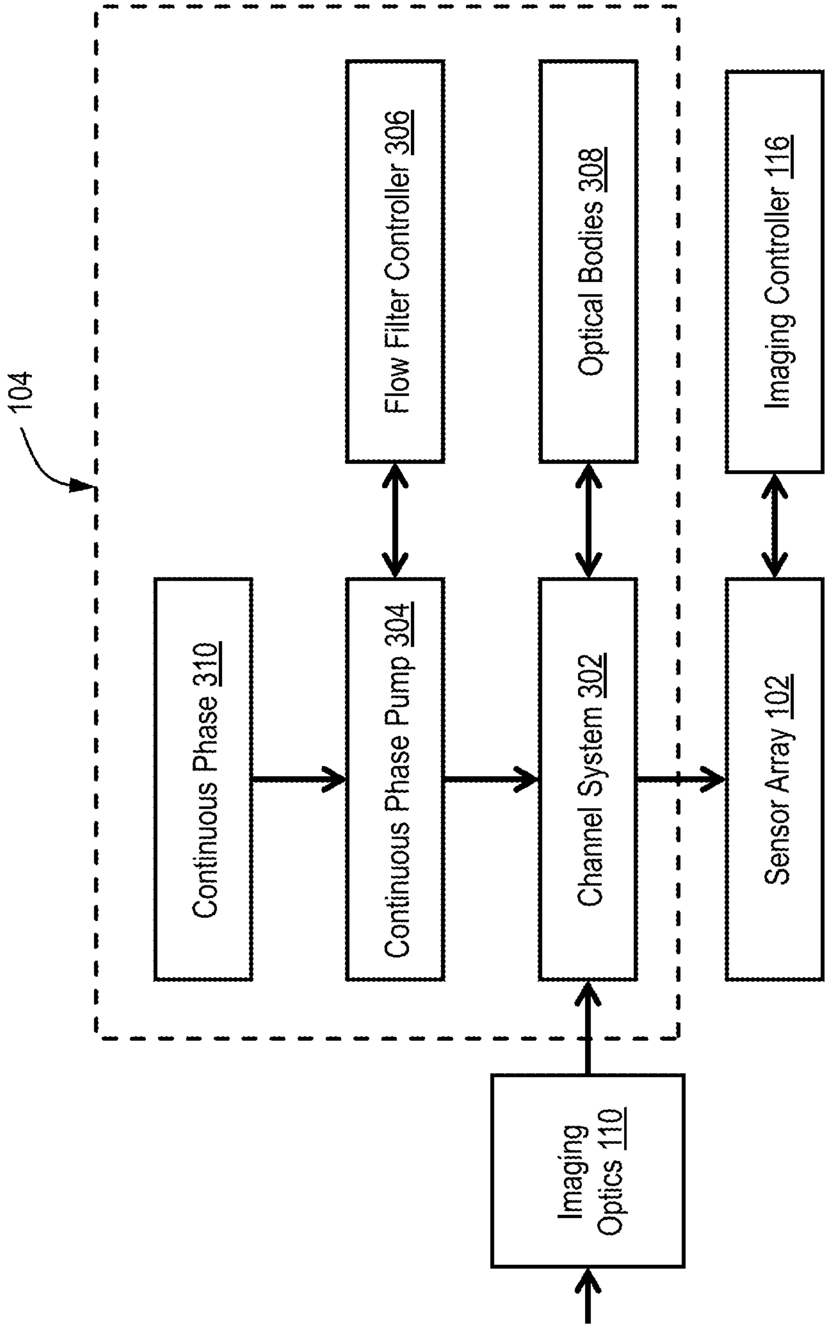
FIG. 3 is a diagram of a flow filter illustrated in accordance with aspects of the present disclosure.

With reference to FIG. 3, an exemplary flow filter 104 is illustrated according to certain aspects of the present disclosure. As shown, the flow filter 104 comprises a fluidic channel system 302, a continuous phase pump 304, and optionally a flow filter controller 306. In embodiments, the flow filter controller 306 is embodied like the imaging controller 112 describe above, but is configured to operate the flow filter 104, i.e., the continuous phase 304 to cause the flow of the optically-active bodies 308. However, in some embodiments, the functionality of the flow filter controller 306 may be integrated into the imaging controller 112. As described herein, the flow filter 104 can also include a plurality of optically-active bodies 308 and a continuous phase 310 that is adapted to carry the optically-active bodies 308 through the fluidic channel system 302.

Figure 4B:
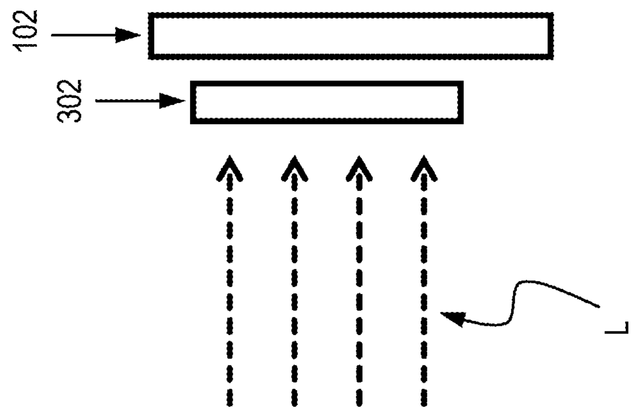
FIG. 4B is a diagram of a flow filter arranged relative to a sensor array illustrated in accordance with further aspects of the present disclosure.
Figure 4A:
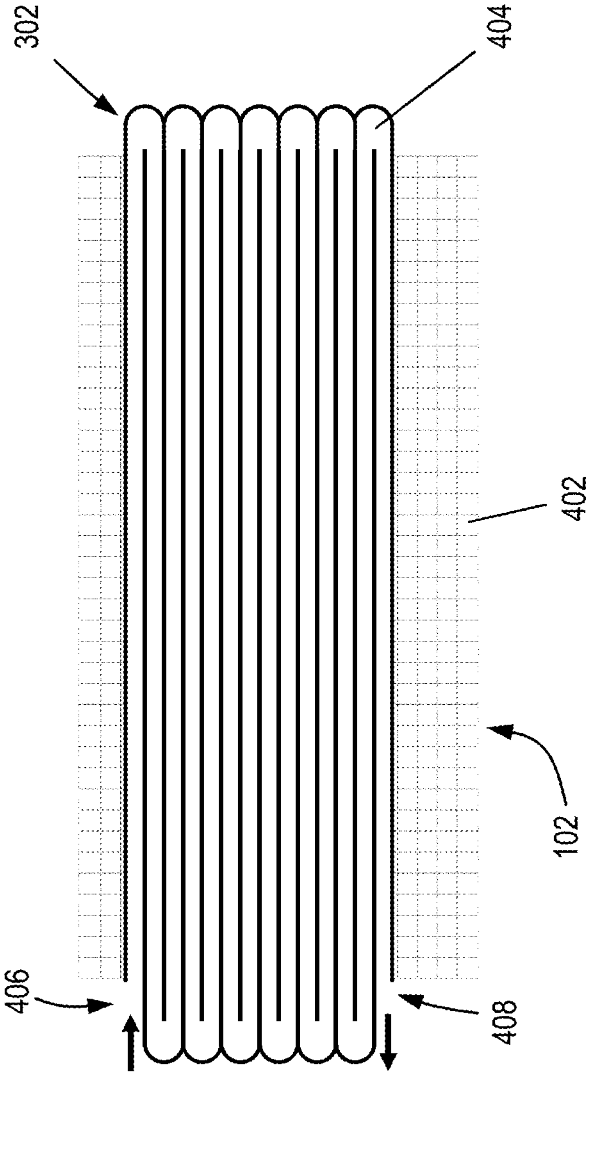
FIG. 4A is a diagram of a flow filter arranged relative to a sensor array illustrated in accordance with aspects of the present disclosure.

In embodiments, the fluidic channel system 302 may be a microfluidic channel system 302 that is arranged relative to the sensor array 102 such that incident light from the imaging subject 106 passes through the fluidic channel system 302 (and the contents of the channels) before reaching the sensor array 102. For example, as shown in the examples of FIGS. 4A and 4B, the microfluidic channel system 302 is arranged relative to the sensor array 102 such that incident light L passes through the channel system 302 before reaching one or more light-sensitive elements 402 of the sensor array 102. While the channel system 302 is shown as covering only a portion of the sensor array 102, the channel system 302 preferably extends to cover the entire sensor array 102.

As described herein, the microfluidic channel system 302 includes one or more fluidic channels 404 through which the optically-active filter bodies 308 may be flowed. It is contemplated that the channels 404 of the channel system 302 may take a number of different arrangements and configurations. For example, as shown in the example of FIG. 4A, the channel system 302 may comprise a winding channel 404 that snakes in alternating directions across the sensor array 102. In some embodiments, the channel system 302 may include an inlet 406 and an outlet 408 where the optically-active filter bodies 308 are introduced and removed. However, in other embodiments, the channel system 302 may be a closed circuit whereby the optically-active filter bodies 308 remain within the one or more channels 404.

In specific embodiments, the microfluidic channel system 302 comprises one or more channels 404 having a channel size configured to sequentially flow individual optically-active bodies 308. That is, the channel size of the one or more channels 404 can be based on the size of the optically-active bodies 308 such that incident light passes through only one optically-active body 308 before reaching a light-sensitive element 402 of the sensor array 102. In specific embodiments, the channel system 302 may include one or more channels 404 having a channel diameter which corresponds to the size of a pixel, which may span from fractions of a micron to tens of microns (i.e., less than about 1 μm to less than about 100 μm).

As mentioned above, the flow filter 104 preferably includes a plurality of optically-active bodies 308 and a liquid continuous phase 310. In embodiments, each of the optically-active bodies 308 are individually tuned to modulate the incident light captured by the hyperspectral imaging system 100 in a non-random manner. Further, the optically-active bodies 308 are configured to be flowable through the channel system 302 by the liquid continuous phase.

Figure 5A:
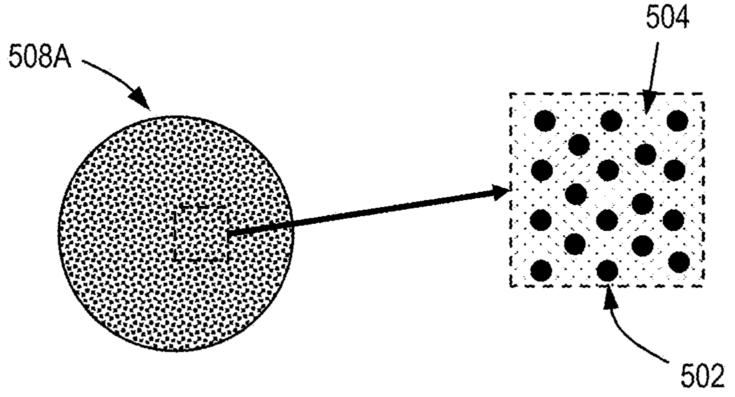
FIG. 5A is a diagram of an optically-active body illustrated in accordance with aspects of the present disclosure.
Figure 5B:
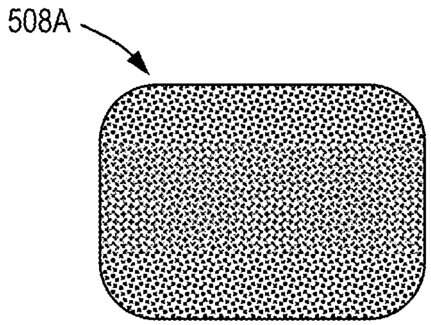
FIG. 5B is a diagram of another optically-active body illustrated in accordance with aspects of the present disclosure.
Figure 5C:
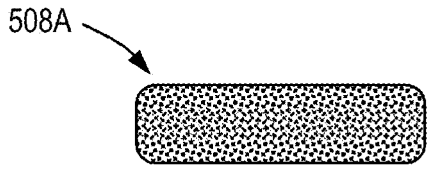
FIG. 5C is a diagram of still another optically-active body illustrated in accordance with aspects of the present disclosure.

In embodiments, the optically-active bodies 308 comprise a body medium and an optically-active component that is contained within the body medium. For example, with reference to FIGS. 5A-5C, several optically-active bodies 508A, 508B, 508C are illustrated in accordance various aspects of the present disclosure. As shown, the optically-active bodies 508A, 508B, 508C can have a different shapes and comprise a body medium 504 that contains an optically-active component 502. In one embodiment, the optically-active bodies 508A may have a spherical shape. In another embodiment, the optically-active bodies 508B may have a slug shape. In yet another embodiment, the optically-active bodies 508C may have a flattened or "pancaked" shape. Still, it is contemplated that other shapes are possible, e.g., cylindrical bodies, etc.

In embodiments, the size and shape of the optically-active bodies 308 may be defined relative to the size of the light-sensitive elements 404, such that at single optically-active body 308 entirely covers one or more light-sensitive elements 404. For example, in some embodiments, the light-sensitive elements 404 may have a square shape with a length/width of about 5 μm, and so each optically-active body 308 may have a length/width and/or diameter of about 5 μm to cover the entire light-sensitive elements 404. In specific embodiments, the optically-active bodies 308 may have a volume on the order of picoliters (i.e., from about 1 pL to about 1000 pL).

In some embodiments, the body medium 504 of the plurality of optically-active bodies 508A, 508B, 508C can comprise a liquid that is immiscible with the liquid continuous phase 310. For example, the liquid continuous phase 310 might be polar (e.g. water), and the body medium 504 might be nonpolar (e.g. toluene), such that the two phases do not mix In further embodiments, the body medium 504 of the plurality of optically-active bodies 508A, 508B, 508C can comprise a solid, a semi-solid, a gel, and a liquid polymer material. For example, the polymer material might include a polydimethylsiloxane (PDMS) base and a crosslinker, e.g. Sylgard™ 184.

In embodiments, the body medium 504 of the plurality of optically-active bodies 508A, 508B, 508C is configured to contain and/or otherwise support the optically-active components 502 of the optically-active bodies 508A, 508B, 508C. Thus, according to various embodiments, the optically-active bodies 508A, 508B, 508C can be a mixture of the body medium 504 and the optically-active component 502, including but not limited to, an emulsion, a suspension, a composite, and/or the like. In further embodiments, the optically-active bodies 508A, 508B, 508C can also and/or alternatively encapsulate the optically-active component 502. For example, the optically-active bodies 508A, 508B, 508C can comprise a hard shell surrounding a fluid containing quantum dots.

Figure 6:
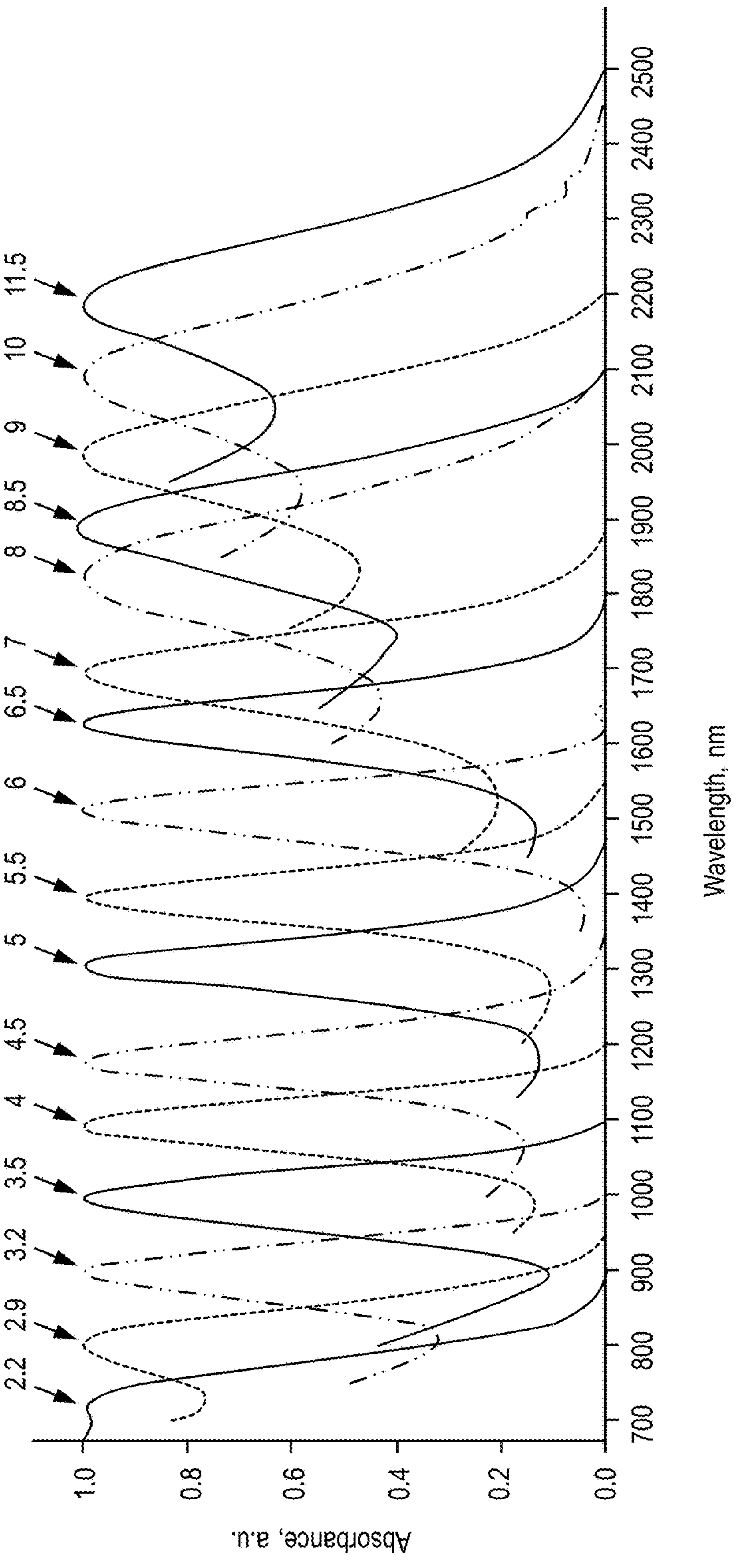
FIG. 6 is a graph of absorbance curves for an optically-active component of different sizes over range of wavelengths illustrated in accordance with aspects of the present disclosure.

According to the present disclosure, the optically-active bodies 508A, 508B, 508C will have a non-random absorption and/or photoluminescence curve over a desired range of wavelengths that is dominated by the optical properties of the optically-active component 502. In specific embodiments, the optically-active component 502 can include a plurality of quantum dots, such as non-emissive and/or emissive quantum dots. With reference to FIG. 6, examples of absorbance curves of PbS quantum dots ranging in size from 2.2 nm to 11.5 nm (produced by Quantum Solutions® under the brand name QDot™) are illustrated. However, it should be appreciated that other optically-active components 502 (e.g., quantum dots of other compositions, etc.) will have different absorbance and emission curves.

The incident light L passing through an optically-active body 508 will be modified according to the non-random optical characteristics of the body, which are largely determined by the optically-active components 502. A non-random optical characteristic may, for example, include an absorption edge within the range of wavelengths of interest. Accordingly, by flowing a plurality of optically-active bodies 508, with varying optical characteristics (e.g. shifted absorbance edges), over a light-sensitive element 402, light intensity measurements can be generated by the light sensitive element 402 and used for spectral recovery.

Figure 7A:
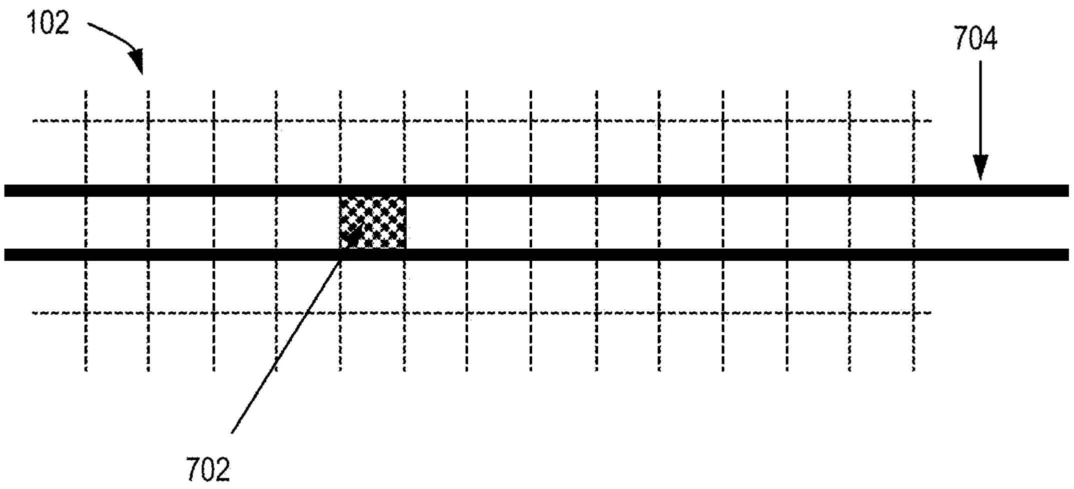
FIG. 7A is a diagram of an exemplary sensor array illustrated in accordance with aspects of the present disclosure.
Figure 7B:
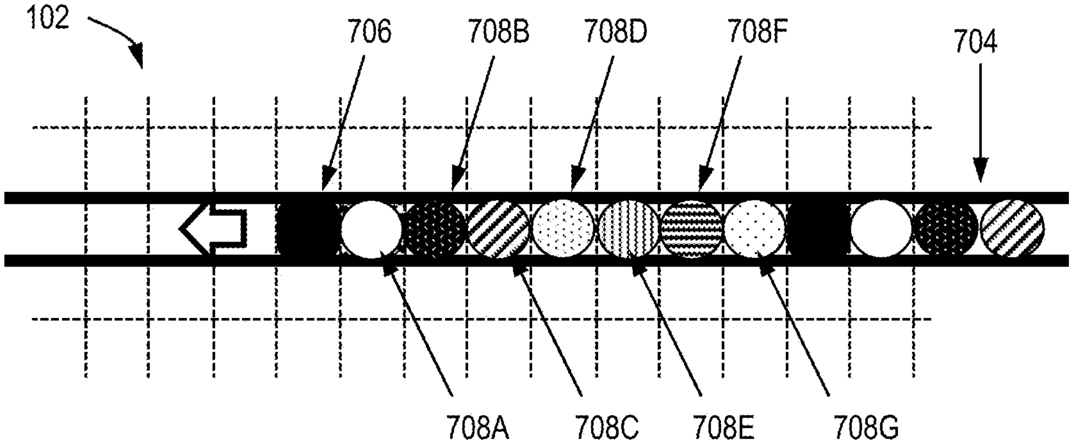
FIG. 7B is a diagram of a plurality of optically-active bodies arranged relative to the sensor array illustrated in accordance with aspects of the present disclosure.

With reference to FIGS. 7A and 7B, a portion of a sensor array 102 and a microfluidic channel 704 are illustrated in accordance with certain aspects of the present disclosure. The microfluidic channel 704 aligned with a row of light-sensitive elements 402 and is configured to flow a plurality of filter bodies 708A-G over these elements 402. For simplicity, one element (or pixel) 702 is highlighted, and a series different optically-active bodies 708A-G are shown flowing over the pixel of interest 702. Because each of the optically-active bodies 708A-G have different absorbance features at different wavelength bands (e.g., based on the distinct absorption curves of the different optically-active components 502), the light intensity observed by the pixel of interest 702 will vary is a non-random manner. The signal (i.e., sensor data) generated by the pixel of interest 702 can then be used to recover a spectral information within a desired range of wavelengths for the incident light L.

As shown in FIG. 7B, the plurality of filter bodies 308 can include at least seven distinct filter bodies 708A-G with sufficiently distinct absorbance features. However, for some applications, fewer or additional distinct filter bodies 708A-G may be used. For example, in some embodiments, it is contemplated that at least three distinct filter bodies 708A-G are used. In further embodiments, between 10 and 1000 distinct filter bodies 708A-G are used, including at least 10, at least 50, and/or at least 100 distinct filter bodies 608A-G.

In still further embodiments, the plurality of filter bodies 308 can comprise repeating cycles of these distinct filter bodies 708A-G such that the entire channel 404, 704 and/or channel system 302 is filled with the plurality of filter bodies 308. The plurality of filter bodies 308 can then be circulated through the channel system 302 via the liquid continuous phase 310 such that the repeating cycles of filter bodies 708A-G are flowed over each light-sensitive element 402 of the sensor array 102. Accordingly, it should be appreciated that in this manner, each light-sensitive element 402 of the sensor array 102 can continuously record light intensity data modulated by the flow filter 104 and ultimately recover a spectral signature for the imaging target 106.

In some embodiments, such as the example shown in FIG. 7B, the plurality of optically-active bodies 308 can include one or more calibration bodies 708A. These calibration bodies 708A may be configured to provide a reference signal used to normalize signal measurements or otherwise aid in spectral recovery.

Figure 8:
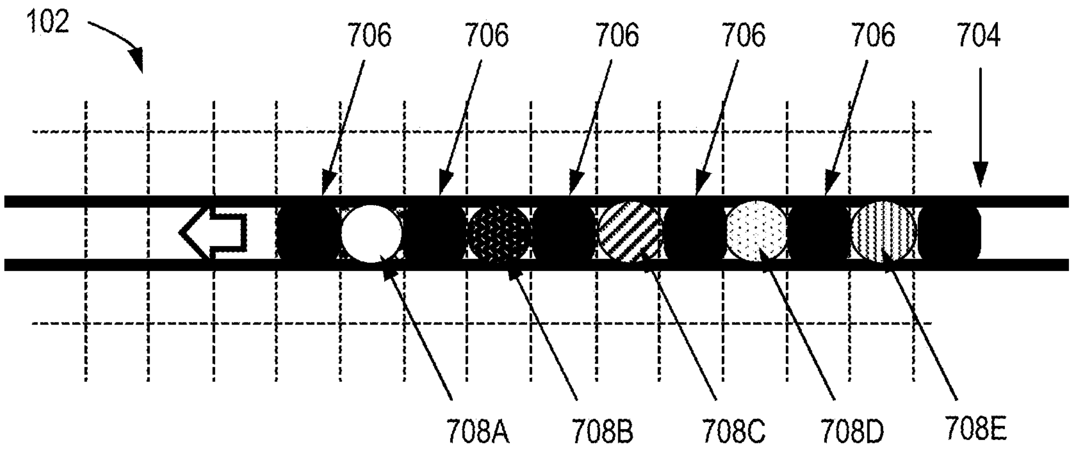
FIG. 8 is another diagram of a plurality of optically-active bodies arranged relative to the sensor array illustrated in accordance with aspects of the present disclosure.

In further embodiments, the flow filter 104 may also include one or more optically opaque spacers 706 as shown in the example of FIG. 8. In embodiments, these opaque spacers 706 may be placed in between each optically-active body 308. These opaque spacers 706 can be configured to block all light from reaching the light-sensitive elements 404 of the sensor array 104. Thus, in this manner, the light-sensitive elements 404 may utilize event-based detection to record light intensity measurements based on the sudden changes in light intensity caused by the moving cycles of spacers 706 and optically-active bodies 308.

In embodiments, the liquid continuous phase 310 may be pumped through the channel system 302 via the continuous phase pump 304 such that the plurality of filter bodies 308 have an average flow velocity in the microchannels 404 of from about 50 μm/s to about 50 cm/s, including about 0.5 cm/s.

Figure 9:
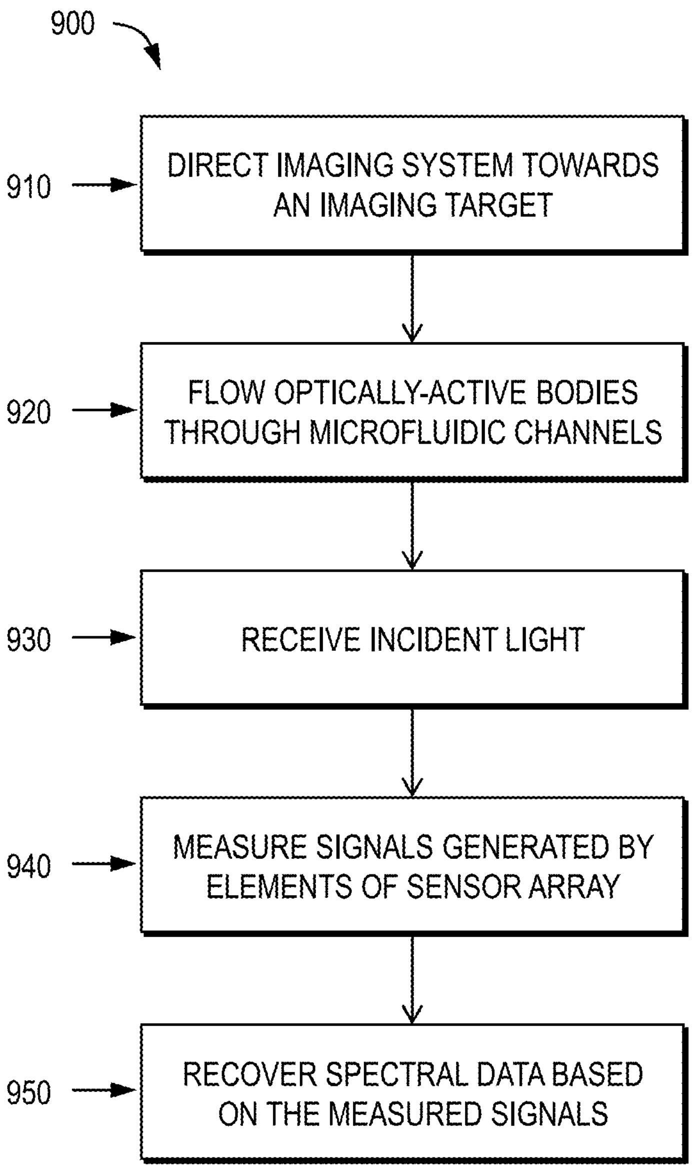
FIG. 9 is a flowchart of a hyperspectral imaging method illustrated in accordance with aspects of the present disclosure.

Also described herein are methods of performing hyperspectral imaging of an imaging target. For example, with reference to FIG. 9, an exemplary method 900 of hyperspectral imaging using a flow filter 104 is illustrated according to aspects of the present disclosure.

As shown, the method 900 can include, in a step 910, directing the imaging optics 110 (e.g., a lens assembly, etc.) of the hyperspectral imaging system 100 towards an imaging target 106.

When the imaging target 106 is ready to be imaged, the method 900 can then include, in a step 920, flowing a plurality of optically-active bodies 308 through a microfluidic channel system 302 of the flow filter 104.

While flowing the optically-active bodies 308 through the microfluidic channel system 302, the method 900 can then include, in a step 930, receiving light that is reflected and/or emitted by the imaging target projected to pass through one or more flowing optically-active bodies. In embodiments, this light (i.e., incident light L) is received through the imaging optics 110 of the hyperspectral imaging system 100.

Then, the method 900 can include, in a step 940, measuring signals from one or more of the plurality of light-sensitive elements 404, 704 of a sensor array 102 that are generated when the received light, after passing through one or more flowing optically-active bodies, reaches the light-sensitive elements 402, 702. As described above, each of the light-sensitive elements 402, 702 measures intensity data which can be used for spectral recovery.

In particular embodiments, the microfluidic channel system 302 is arranged relative to the sensor array 102 of the hyperspectral imaging system 100 such that the received light passes through one or more of the plurality of optically-active bodies 308 flowing within the microfluidic channel system 302 before reaching one or more of the plurality of light-sensitive elements of the sensor array 102.

In embodiments, the sensor data collected by the light-sensitive elements 402, 702 may also indicate spatial coordinates such that spatial and light intensity data is recorded. In further embodiments, this sensor data can be collected in a "snapshot" manner, i.e., over the course of several seconds or less. In other embodiments, sensor data may be collected over extended periods of time.

Once the sensor data is collected, the method 900 can include, in a step 950, recovering spectral data (or spectral signature) for the imaging target 106 based on the measured signals. In embodiments, light intensity measurements may be processed and the spectral data recovered by one or more processors 202 of a hyperspectral imaging controller 112. In particular embodiments, spectral data/signature may be recovered using a compressive sensing algorithm and/or a trained machine learning algorithm.

In particular, measurements of an optical spectrum, denoted by the vector x, where each entry is an intensity value at a wavelength or band of wavelengths, involves the measurement of multiple light intensities through more than one filtering element (e.g., the optically-active bodies 308) with known spectral responses. These spectral responses can be assembled into a sensing matrix, denoted ¢, where each row corresponds to a filtering element and each entry within each row is an optical transmission value at a wavelength or range of wavelengths for the corresponding filtering element. The measured intensities through each filtering element can be assembled into a measurement vector, denoted y. The measurement process can be modeled according to Eqn. 1:

$$y=\Phi x \quad (1)$$

where y has dimension N×1, where N is the total number of filtering elements (e.g., optically-active bodies 308), Φ has dimension N×M, where M is the number of spectral response datapoints obtained for each filtering element, and x has a dimension of M×1.

It will be appreciated that the spectral accuracy will depend on the measurement and recovery processes. In practice, typically N<<M, and an inverse of Φ cannot be easily computed to determine x from y. Hence, signal recovery methods are necessary.

Accordingly, in one embodiment, the step 950 can include a signal recovery method such as compressive sensing (CS), which involves the recovery of x in a domain where it has a sparse representation. In this context, sparse refers to a mathematical property where most coefficients in a transformed basis are zero or near zero. Typically, optical spectra are not sparse. To express the signal in a sparse form, we assume following:

$$x_s=\Psi x \quad (2)$$

where $x_s$ is a sparse representation of x and Ψ is a transformation matrix (e.g., discrete cosine transform, wavelet transform, Fourier transform) suitable for enforcing sparsity. The recovery problem can then be framed as:

$$y=\Phi\Psi x \quad (3)$$

where $x_s$ (Ψx) is recovered using an optimization algorithm (e.g., basis pursuit).

Accordingly, x can then be recovered from $x_s$ using the inverse of the transformation matrix:

$$x=\Psi^{-1}x_s \quad (4)$$

According to another embodiment, the step 950 can include a signal recovery method involving the use of machine learning (ML) and/or artificial intelligence (AI). In this embodiment, y may be considered a latent representation of x, wherein a decoder structure is trained to recover x from y based on sets of training data representative of the spectra to be observed. The decoder architecture may include but is not limited to fully connected layers, skip connections, batch normalization layers, or attention mechanisms, and combinations thereof. The decoder may generally be expressed as a function like:

$$D(y)=x' \quad (5)$$

where D(y) is the entire decoder process and x' is its output.

The parameters of the decoder, which may include weights and/or biases, may be trained using gradient descent according to some objective function (e.g. mean squared error) which compares a true input spectrum, x, and its corresponding recovered spectrum, x'. In order to avoid overfitting and allow the network to generalize well to out-of-distribution data, many different input spectra (x vectors) should be used in training. When a suitably low error between the true and recovered spectra is reached, the network may be tested on a test set where this set is comprised of spectra the network has not been trained on. Nonlinearities may also be introduced through activation functions (e.g. ReLU, Leaky ReLU) and initialization of the network parameters may vary according to the activation function used and/or overall architecture. Careful choices of all of these aspects may significantly improve the performance of the network.

In order to enhance the robustness of the network, it is also possible to incorporate a probabilistic approach, especially to capture epistemic uncertainty. This could be done using, for example, a probabilistic decoder which samples from the latent space (y vector space) using an assumed variance, which could correspond to measurement noise. This network could be trained using the KL divergence objective function, wherein the recovered spectrum is pushed towards the true distribution given by the spectra inputted into the measurement process.

As described here, the signal recovery process is repeated for each pixel (i.e., light-sensitive element 402) of the sensor array 102. Based on the spatial information collected and knowledge of the sensor array 102, spectral images may also be generated.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

As used herein, although the terms first, second, third, etc. may be used herein to describe various elements or components, these elements or components should not be limited by these terms. These terms are only used to distinguish one element or component from another element or component. Thus, a first element or component discussed below could be termed a second element or component without departing from the teachings of the inventive concept.

Unless otherwise noted, when an element or component is said to be "connected to," "coupled to," or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

It should also be understood that, unless clearly indicated to the contrary, in any methods claimed herein that include more than one step or act, the order of the steps or acts of the method is not necessarily limited to the order in which the steps or acts of the method are recited.

The above-described examples of the described subject matter can be implemented in any of numerous ways. For example, some aspects can be implemented using hardware, software or a combination thereof. When any aspect is implemented at least in part in software, the software code can be executed on any suitable processor or collection of processors, whether provided in a single device or computer or distributed among multiple devices/computers.

The present disclosure can be implemented as a system, a method, and/or a computer program product at any possible technical detail level of integration. The computer program product can include a computer readable storage medium (or media) having computer readable program instructions thereon for causing a processor to carry out aspects of the present disclosure.

A computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium comprises the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, comprising an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, comprising a local area network (LAN) or a wide area network (WAN), or the connection can be made to an external computer (for example, through the Internet using an Internet Service Provider). In some examples, electronic circuitry comprising, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions can be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture comprising instructions which implement aspects of the function/act specified in the flowchart and/or block diagram or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams can represent a module, segment, or portion of instructions, which comprises one or more executable instructions for implementing the specified logical function (s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant can be entitled.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A hyperspectral imaging system comprising:
   a flow filter comprising a plurality of optically-active bodies and a microfluidic channel system, the microfluidic channel system defining a flow path for the plurality of optically-active bodies; and
   a sensor array comprising a plurality of light-sensitive elements, wherein each light-sensitive sensor is configured to measure the intensity of light that is reflected and/or emitted by an imaging target located outside of the imaging system, the light having been modified by the optically-active bodies within the flow filter;
   wherein the microfluidic channel system of the flow filter is arranged relative to the sensor array such that the light that is reflected and/or emitted by the imaging target passes through the microfluidic channel system before reaching one or more of the plurality of light-sensitive elements.

2. The hyperspectral imaging system of claim 1, wherein the plurality of optically-active bodies comprises at least three filter bodies having distinct optical characteristics over a desired spectrum, and wherein the distinct optical characteristics include at least one of a distinct absorbance curve and/or a distinct photoluminescence curve.

3. The hyperspectral imaging system of claim 2, wherein the plurality of optically-active bodies comprises a repeating sequence of the at least three filter bodies.

4. The hyperspectral imaging system of claim 2, wherein the plurality of optically-active bodies comprises at least fifty filter bodies having distinct optical characteristics over the desired spectrum.

5. The hyperspectral imaging system of claim 1, wherein the flow filter further comprises:
   a liquid continuous phase; and
   a continuous phase pump fluidly connected to the microfluidic channel system; and
   wherein the continuous phase pump is configured to pump the liquid continuous phase through the microfluidic channel system, and wherein the plurality of optically-active bodies are carried through the microfluidic channel system by the liquid continuous phase.

6. The hyperspectral imaging system of claim 4, wherein the plurality of optically-active bodies are ordered sequentially and carried sequentially through the microfluidic channel system.

7. The hyperspectral imaging system of claim 1, wherein each optically-active body of the plurality of optically-active bodies comprises a body medium and an optically-active component contained within the body medium.

8. The hyperspectral imaging system of claim 7, wherein the optically-active component comprises a plurality of quantum dots.

9. The hyperspectral imaging system of claim 8, wherein the plurality of optically-active bodies comprises at least three filter bodies having distinct optical characteristics over a desired spectrum,
   wherein the distinct optical characteristics include at least one of a distinct absorbance curve and/or a distinct photoluminescence curve, and
   wherein the optically-active component of each of the at least three filter bodies comprises quantum dots having a different size, shape, and/or composition.

10. The hyperspectral imaging system of claim 7, wherein the body medium comprises a liquid that is immiscible with the liquid continuous phase.

11. The hyperspectral imaging system of claim 7, wherein the body medium comprises at least one of a solid, a semi-solid, a gel, and a liquid polymer material.

12. The hyperspectral imaging system of claim 1, wherein the flow filter further comprises one or more optically opaque spacers disposed between each of the plurality of optically-active bodies.

13. The hyperspectral imaging system of claim 1, further comprising a hyperspectral imaging controller, wherein the hyperspectral imaging controller comprises:
   one or more processors; and
   a non-transitory computer-readable memory storing instructions that, when executed by the one or more processors, causes the hyperspectral imaging controller to perform one or more of the following operations:
      generating sensor data using the sensor array based on the light that is reflected and/or emitted by the imaging target, wherein the sensor data comprises, for each light-sensitive element of the sensor array, a plurality of light intensity measurements; and
      recovering a spectral signature for the imaging target based on the sensor data generated, wherein the spectral signature is recovered using a compressive sensing algorithm and/or a trained machine learning algorithm.

14. A flow filter for moderating light, the flow filter comprising:
   a plurality of optically-active bodies, wherein each optically-active body comprises a body medium and an optically-active component contained within the body medium;
   a microfluidic channel system defining a flow path for the plurality of optically-active bodies;
   a liquid continuous phase configured to carry the plurality of optically-active bodies through the microfluidic channel system along the flow path; and
   a continuous phase pump fluidly connected to the microfluidic channel system, wherein the continuous phase pump is configured to pump the liquid continuous phase through the microfluidic channel system such that the liquid continuous phase carries the plurality of optically-active bodies through the microfluidic channel system along the flow path.

15. The flow filter of claim 14, wherein the plurality of optically-active bodies comprises at least three filter bodies having distinct optical characteristics over a desired spectrum,
   wherein the distinct optical characteristics include at least one of a distinct absorbance curve and/or a distinct photoluminescence curve,
   wherein the optically-active component of the plurality of optically-active bodies comprises a plurality of quantum dots, and
   wherein each of the at least three filter bodies comprise quantum dots having a different size, shape, and/or composition.

16. The flow filter of claim 14, wherein the body medium of the plurality of optically-active bodies comprises a liquid that is immiscible with the liquid continuous phase, and/or
   wherein the body medium of the plurality of optically-active bodies comprises a solid, a semi-solid, a gel, and a liquid polymer material.

17. The flow filter of claim 14, wherein the plurality of optically-active bodies are ordered sequentially and carried sequentially through the microfluidic channel system.

18. A method of hyperspectral imaging using a hyperspectral imaging system comprising a lens, a flow filter, a sensor array having a plurality of light-sensitive elements, and a hyperspectral imaging controller, the method comprising:

directing the lens of the hyperspectral imaging system towards an imaging target;

flowing a plurality of optically-active bodies through a microfluidic channel system of the flow filter;

receiving, through the lens of the hyperspectral imaging system, light that is reflected and/or emitted by the imaging target; and measuring signals from one or more of the plurality of light-sensitive elements of the sensor array based on the light that is reflected and/or emitted by the imaging target and filtered by one or more optically-active bodies of the plurality of optically-active bodies; and recovering, via one or more processors of the hyperspectral imaging controller, a spectral data for the imaging target based on the measured signals;

wherein the microfluidic channel system is arranged relative to the sensor array such that the received light that is reflected and/or emitted by the imaging target is passed through one or more of the plurality of optically-active bodies flowing within the microfluidic channel system before reaching one or more of the plurality of light-sensitive elements of the sensor array.

19. The method of claim 18, wherein the plurality of optically-active bodies comprises at least three filter bodies having distinct optical characteristics over a desired spectrum, wherein the distinct optical characteristics include at least one of a distinct absorbance curve and/or a distinct photoluminescence curve, and wherein the measured signals include light intensity measurements corresponding to the received light that has passed through each of the at least three filter bodies.

20. The method of claim 18, wherein each optically-active body of the plurality of optically-active bodies comprises a body medium and an optically-active component contained within the body medium, wherein the optically-active component comprises a plurality of quantum dots, and wherein the plurality of optically-active bodies are ordered sequentially and flowed sequentially through the microfluidic channel system.

* * * * *